(12) United States Patent
Koers et al.

(10) Patent No.: US 9,200,143 B2
(45) Date of Patent: Dec. 1, 2015

(54) PROCESS FOR CURING THERMOSET RESINS

(71) Applicant: Akzo Nobel Chemicals International B.V., Amersfoort (NL)

(72) Inventors: Frederik Willem Karel Koers, Epse (NL); Auke Gerardus Talma, Bathmen (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/421,345

(22) PCT Filed: Aug. 14, 2013

(86) PCT No.: PCT/EP2013/066951
§ 371 (c)(1),
(2) Date: Feb. 12, 2015

(87) PCT Pub. No.: WO2014/027007
PCT Pub. Date: Feb. 20, 2014

(65) Prior Publication Data
US 2015/0203659 A1 Jul. 23, 2015

Related U.S. Application Data

(60) Provisional application No. 61/693,807, filed on Aug. 28, 2012.

(30) Foreign Application Priority Data

Aug. 17, 2012 (EP) .................................... 12180827

(51) Int. Cl.
*C08K 5/29* (2006.01)
*C08K 5/14* (2006.01)
*C08K 5/17* (2006.01)

(52) U.S. Cl.
CPC ... *C08K 5/29* (2013.01); *C08K 5/14* (2013.01); *C08K 5/175* (2013.01)

(58) Field of Classification Search
CPC .............................. C08G 63/52; C08G 63/918
USPC .......................... 525/447, 408, 415
See application file for complete search history.

(56) References Cited

U.S. PATENT DOCUMENTS

| 3,645,908 A | 2/1972 | Edl et al. |
| 4,042,646 A | 8/1977 | Edamura et al. |
| 4,368,311 A | 1/1983 | Binder et al. |
| 2002/0137972 A1 | 9/2002 | Syed et al. |

FOREIGN PATENT DOCUMENTS

| DE | 2538013 A1 | 8/1975 |
| EP | 0038924 A2 | 3/1981 |
| EP | 0420133 A2 | 9/1990 |
| GB | 1000906 | 8/1965 |
| JP | S51-034985 | 9/1974 |
| WO | WO2008/003492 A1 | 1/2008 |
| WO | WO2008/003493 A1 | 1/2008 |
| WO | WO2008/003500 A1 | 1/2008 |

OTHER PUBLICATIONS

European Search Report for EP12180828.1 dated May 4, 2013.
European Search Report for EP12180827.3 dated Nov. 4, 2013.
International Search Report for PCT/EP2013/066952 date of mailing Feb. 18, 2014.
International Search Report for PCT/EP2013/066951 date of mailing Feb. 25, 2014.

*Primary Examiner* — Terressa Boykin
(74) *Attorney, Agent, or Firm* — Alice C. Su

(57) ABSTRACT

Process for curing a thermoset resin comprising the step of contacting said resin with (i) one or more imines of the structure Formula (I), wherein —y=0 or 1, z=1-4, and y+z≥2, —X is independently selected from O, S, P, NH, N—R1, and N—OH, —R1 is selected from linear or branched, cyclic, bi-cyclic, or tri-cyclic alkylene groups with 2-18 carbon atoms, arylene groups with 6-12 carbon atoms, and aralkylene groups with 2-18 carbon atoms, —R2-R5 are individually selected from hydrogen, linear or branched alkyl groups having 1-18 carbon atoms, cycloalkyl groups having 3-12 carbon atoms, aryl groups having 6-12 carbon atoms, aralkyl groups having 6-18 carbon atoms, alkoxy groups having 1-6 carbon atoms, and aryloxy groups; —each of said R-groups may optionally be substituted with O, S, Si, P, or N-containing substituents, —R4 and R5; R3 and R4; R2, R5 and R1 and R3 may optionally form ring, and (ii) a peroxide.

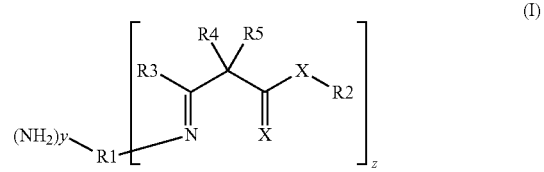

14 Claims, No Drawings

PROCESS FOR CURING THERMOSET RESINS

This application is a national stage filing under 35 U.S.C. §371 of PCT/EP2013/066951, filed Aug. 14, 2013, which claims priority to U.S. Provisional Patent Application No. 61/693,807 filed Aug. 28, 2012, and European Patent Application No. 12180827.3, filed Aug. 17, 2012, the contents of which are each incorporated herein by reference in their entireties.

The present invention relates to a process for curing thermoset resins. Such resins are conventionally cured using a redox system comprising an oxidizing agent (e.g. a peroxide) and a soluble transition metal ion complex as accelerator. The accelerator serves to increase the activity of the oxidizing agent at lower temperatures and, consequently, to speed up the curing rate.

Typical accelerators comprise a transition metal salt or complex. The most frequently used transition metal for this purpose is cobalt. However, legislation requires reduction of the amount of cobalt in view its toxicity.

As a result, there is a desire for the provision of Co-free accelerators. Examples of documents disclosing such Co-free accelerator systems are WO 2008/003492, WO 2008/003793, and WO 2008/003500. The metals used in the accelerator systems according to these documents—instead of Co—are Mn, Cu, Fe, and Ti.

It would, however, be even more desirable to provide a metal-free accelerator system.

Such a system has been described in the past, in U.S. Pat. No. 4,042,646, and uses a β-amino-α,β-unsaturated ketone as accelerator in combination with a peroxide containing a hydroperoxy (—OOH) group.

This accelerating system did, however, never find its way to commercial application. The reason is, most probably, that the performance is not satisfactory.

It has now been found that such metal-free systems can be further improved by the use of an imine with structure (I) as displayed below. The invention therefore relates to a process for curing thermoset resins comprising the step of contacting said resin with (i) one or more imines of structure (I)

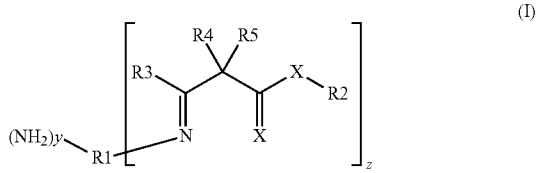

wherein:
y=0 or 1, z=1-4, and y+z≥2,
X is independently selected from O, S, P, NH, N—R1, and N—OH
R1 is selected from linear or branched, cyclic, bi-cyclic, or tri-cyclic alkylene groups with 2-18 carbon atoms, arylene groups with 6-12 carbon atoms, and aralkylene groups with 2-18 carbon atoms,
R2-R5 are individually selected from hydrogen, linear or branched alkyl groups having 1-18 carbon atoms, cycloalkyl groups having 3-12 carbon atoms, aryl groups having 6-12 carbon atoms, aralkyl groups having 6-18 carbon atoms, alkoxy groups having 1-6 carbon atoms, and aryloxy groups;
each of said R-groups may optionally be substituted with O, S, Si, P, or N-containing substituents, and
R4 and R5, R3 and R4; R2 and R5, and/or R1 and R3 may optionally form ring.
and (ii) a peroxide In a preferred embodiment, X in structure (I) is an oxygen atom.

More preferably, the one or more imines is/are the reaction product of a polyamine and a 3-oxoalkanoic acid alkyl ester.

Suitable polyamines include di-amines, tri-amines, and tetra-amines. Examples of suitable di-amines are isophorone diamine, tricyclododecanediamine, 1,6 diamino 2,2,4 trimethyl hexane, 1,3-methylene cyclohexane, 1,3-cyclohexyl diamine, 1,4-cyclohexyl diamine, 1,3-propylene diamine, 1,3-butane diamine and 1,4-butane diamine, 1,3-pentane diamine, 1,4-pentane diamine, 1,5-pentane diamine, 1,3-hexane diamine, 1,4-hexane diamine, 1,5-hexane diamine, 1,6-hexane diamine, 1,5-diamino-2-methyl pentane (Dytek A), 1,8-diamino octane, 1,9-diamino nonane, 1,10-diamino decane, 1,12-diamino dodecane, 1,3-xylylene diamine, 1,4-xylylene diamine, 1,3-benzene diamine, 1,4-benzene diamine, di-aniline methane, di-aniline ether, di-aniline sulphone, 1,8-diamino-3,6-dioxaoctane, 1,5-diamino-3-oxapentane, α,ω-polyglycol diamines (Jeffamines), α,ω-polypropoxy diamines (Jeffamines), and α,ω-tetrahydrofuryl diamines.

Examples of suitable tri-amines are tris(2-aminoethyl) amine, 4-(aminomethyl)octane-1,8-diamine, and polyoxypropylene triamine (Jeffamine® T-403).

A suitable tetra-amine is pentaerytritol-tetramine.

The preferred polyamine is isophorone diamine (1-amino-3-aminomethyl-3,5,5-trimethyl cyclohexane).

Examples of suitable 3-oxoalkanoic acid alkyl esters are alkyl esters of 3-oxobutanoic acid. Preferred alkyl esters of 3-oxobutanoic acid are the methyl ester, the ethyl ester, the propyl ester, the butyl ester, and the benzyl ester. The ethyl ester of 3-oxobutanoic acid (i.e. ethyl acetoacetate) is the most preferred 3-oxoalkanoic acid alkyl ester. The use of this most preferred 3-oxoalkanoic acid alkyl ester results in an imine of structure (I) wherein R3 is methyl, R2 is ethyl, and R4 and R5 are hydrogen.

The most preferred imines are the reaction products of isophorone diamine and ethyl acetoacetate.

The one or more imines can be synthesized by reacting the polyamine with the 3-oxoalkanoic acid alkyl ester in such a ratio that one or more products with structure (I) are formed. Generally, a mixture of imines according to structure (I) is formed in this reaction. Depending on the type of polyamine, different molar ratios can be used. If a di-amine is used, a molar ratio polyamine:3-oxoalkanoic acid alkyl ester of between 1:2 and 2:1 is suitable, with a preference for a molar ratio close to 1:1. If a tri-amine is used, a molar ratio between 1:3 and 3:1 is suitable, with a preference for a molar ratio close to 1:1. If a tetra-amine is used, a molar ratio between 1:4 and 4:1 is suitable, with a preference for a molar ratio close to 1:1.

The one or more imines can be synthesized prior to their use in the process according to the present invention. This pre-synthesis involves the reaction between the polyamine and the 3-oxoalkanoic acid alkyl ester, preferably in the presence of a solvent. This is an exothermic reaction. After the reaction, water can be removed.

Alternatively, the polyamine and the 3-oxoalkanoic acid alkyl ester are added individually to the thermoset resin, resulting in in-situ imine formation. The main difference with the pre-synthesis is that formed water will not be removed in this in-situ process.

The imine or the mixture of imines is preferably used in the process according to the invention in an amount of 0.01 to 10 parts by weight (pbw), more preferably 0.1 to 5 pbw, most preferably 0.5 to 2 pbw based on 100 parts by weight of resin.

The peroxide to be used in the process of the present invention is preferably an organic hydroperoxide, a ketone peroxide, or a mixture thereof. Ketone peroxides have the formula

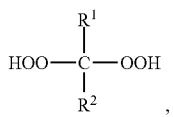

wherein $R^1$ is an alkyl group, preferably methyl; and $R^2$ is an alkyl group, preferably ethyl, isopropyl, or isobutyl;
or the formula

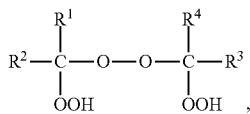

wherein $R^1$ and $R^4$ are alkyl groups, preferably methyl; and $R^2$ and $R^3$ are alkyl groups, preferably ethyl, isopropyl, or isobutyl.

The first formula reflects a so-called type-4 ketone peroxide; the second formula a so-called type-3 ketone peroxide. Both types are generally present in the peroxide formulation, in addition to hydrogen peroxide.

The peroxide is preferably used in the process of the present invention in an amount of 0.1 to 10 parts by weight (pbw), more preferably 0.5 to 5 pbw, most preferably 1-2 pbw, based on 100 parts by weight of resin.

Suitable thermoset resins to be cured in accordance with the process of the present invention include unsaturated polyester (UP) resins, vinyl ester resins, (meth)acrylate resins, polyurethanes, epoxy resins, and combinations thereof like combinations of UP resins and epoxy resins or combinations of different UP resins. Preferred resins are (meth)acrylate resins, UP resins and vinyl ester resins. In the context of the present application, the terms "unsaturated polyester resin" and "UP resin" refer to the combination of unsaturated polyester resin and ethylenically unsaturated monomeric compound. The term "(meth)acrylate resin" refers to the combination of acrylate or methacrylate resin and ethylenically unsaturated monomeric compound. UP resins and acrylate resins as defined above are common practice and commercially available.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Vinyl ester resins include acrylate resins, based on, e.g. methacrylate, diacrylate, dimethacrylate, and oligomers thereof.

Acrylate resins include acrylates, methacrylates, diacrylates and dimethacrylates, and oligomers thereof.

Unsaturated polyester or vinyl ester resin may contain a monomer. Examples of suitable monomers are ethylenically unsaturated monomeric compounds such as styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth)acrylate, pentaerythritol tetra (meth)acrylate, glycidyl (meth)acrylate, (bis)maleimides, (bis)citraconimides, (bis)itaconimides, and mixtures thereof.

The amount of ethylenically unsaturated monomer in the resin is preferably at least 0.1 wt %, based on the weight of the unsaturated polyester or vinyl ester resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

The process according to the invention involves the step of contacting the peroxide and the imine(s) with the resin. These compounds can be added to each other in any order. In one embodiment, the resin can be pre-accelerated with the imine(s) and curing is performed by adding the peroxide either quickly thereafter or days, weeks, or months later. It is also possible to add the peroxide and the imine (almost) simultaneously.

When the imine(s) to be used is/are solid at room temperature, it is preferred to melt the imine(s) or to dissolve them into a suitable solvent prior to its addition to the resin. Examples of suitable solvents are white spirit, diethylene glycol, propylene glycol, dibutyl phosphate, Methyl phosphate, methylethyl ketone, ethyl proxytol.

The peroxide is preferably added to the resin diluted in a suitable phlegmatizer. Phlegmatizers that can be used in these formulations are of the conventional type and are preferably selected from alkanols, cycloalkanols, alkylene glycols, alkylene glycol monoalkyl ethers, cyclic ether substituted alcohols, cyclic amides, esters, ketones, aromatic solvents, halogenated hydrocarbon solvents, and mixtures thereof.

Other compounds that may be present during the process of the invention are alkali or alkaline earth metal compounds, phosphorous-containing compounds, 1,3-diketones, nitrogen-containing bases, and reducing agents.

Examples of 1,3-diketones are acetyl acetone, benzoyl acetone, and dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate.

Examples of alkali or alkaline metal compounds are alkali or alkaline metal carboxylate salts such as the 2-ethyl hexanoates, octanoates, nonanoates, heptanoates, neodecanoates, and naphthenates of alkali metals, and alkaline earth metals. A preferred alkali metal is K.

Examples of phorphorous-containing compounds are phosphorous compounds with the formulae $P(R)_3$ and P(R)₃=O, wherein each R is independently selected from hydrogen, alkyl with 1 to 10 carbon atoms, and alkoxy groups with 1 to 10 carbon atoms. Preferably, at least two R-groups are selected from either alkyl groups of alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

Examples of nitrogen-containing bases are tertiary amines like triethyl amine, dimethylaniline, diethylaniline, or N,N-dimethyl-p-toludine (DMPT), polyamines like 1,2-(dimethyl amine)ethane, secondary amines like diethyl amine, ethoxylated amines like triethanol amine, dimethylamino ethanol, diethanol amine, or monoethanol amine, and aromatic amines like bipyridine.

Examples of reducing agents are ascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, and aldehydes, and mixtures thereof. Ascorbic acid, which term in this specification includes L-ascorbic acid and D-isoascorbic acid, is the preferred reducing agent.

Although it is possible add transition metal compounds, such as Co, Cu, Mn, V, or Fe-compounds to the resin, it is preferred to conduct the process of the invention in the absence of such compounds. If one or more of these metals would be present, then they are preferably present in an amount (calculated as metal) of 0.02 to 10 mmol/kg resin, more preferably 0.10 to 5 mmol/kg resin, and most preferably at least 0.25 to 2 mmol/kg resin.

The above-mentioned "Other compounds" and the optional transition metal compounds, can be added to the resin individually, or in the form of an accelerator solution comprising, apart from said compounds and optional solvents, also the one or more imines of structure (I).

Such accelerator solutions can be prepared by mixing these compounds, the optional solvents, and the pre-synthesized imine. Alternatively, a polyamine and a 3-oxoalkanoic acid alkyl ester can be added to said compounds and optional solvents to form the one or more imines in situ in said accelerator solution.

Optional additives that may be present during the process of the invention are fillers, fibres, pigments, radical inhibitors, fire retardants, and promoters.

In a preferred embodiment, the process is performed in the presence of a filler and/or a reinforcement fibre. Examples of reinforcement fibres are glass fibres, carbon fibres, aramid fibres (e.g. Twaron®), and natural fibers (e.g. jute, kenaf, industrial hemp, flax (linen), ramie, etc.). Examples of fillers are quartz, sand, aluminium trihydroxide, magnesium hydroxide, chalk, calcium hydroxide, clays, titanium dioxide, and lime.

Fire retardants include both halogen-containing and phosphorous-containing fire retardants. Examples of radical inhibitors include 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene, di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (TEMPOL), 1-oxyl-2,2,6,6-tetramethylpiperidine-4-one (TEMPON), 1-oxyl-2,2,6,6-tetramethyl-4-carboxyl-piperidine (4-carboxy-TEMPO), 1-oxyl-2,2,5,5-tetramethylpyrrolidine, 1-oxyl-2,2,5,5-tetramethyl-3-carboxylpyrrolidine (3-carboxy-PROXYL), aluminium-N-nitrosophenyl hydroxylamine, diethylhydroxylamine, phenothiazine, and combinations thereof.

When the resin, peroxide, and imine are in contact with each other, these compounds are mixed and dispersed. The curing process can be carried out at any temperature from −15° C. up to 250° C. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

The cured composition can be subjected to a post-cure treatment to further optimize the hardness. Such post-cure treatment is generally performed at a temperature in the range 40-180° C. for 30 min to 15 hours.

The cured compositions find use in various applications, including marine applications, chemical anchoring, roofing, construction, relining, pipes and tanks, flooring, windmill blades, laminates, etc.

EXAMPLES

The following materials were used in the examples below:
Palatal P6—an ortho phthalic acid-based unsaturated polyester resin (ex-DSM resins)
Butanox® P50—methyl isopropyl ketone peroxide (50 wt % in dimethylphthalate; ex-AkzoNobel)
Butanox® M50—methyl ethyl ketone peroxide with an active oxygen content of 8.9 wt % (50 wt % in dimethylphthalate; ex-AkzoNobel)
Trigonox® 233—methyl isobutyl ketone peroxide (50 wt % in isododecane; ex-AkzoNobel)
IPDA—Isophoronediamine
EAA—Ethyl acetoacetate
Reference imine—ethyl-3-(n-butylamino)-2-butenoate
EEA (0.572 mol) was dissolved in diethyl ether (200 ml). IPDA (0.572 mol) was added in portions. The temperature of the mixture rose to 35° C. and this temperature was maintained for 2 h with heating. After cooling to room temperature, diethyl ether (100 ml) was added, followed by the addition of sodium sulfate. The mixture was dried overnight. The solids were removed by filtration and the volatiles were removed in vacuo, yielding 160 g (99%) of the imine mixture displayed below as a clear oil:

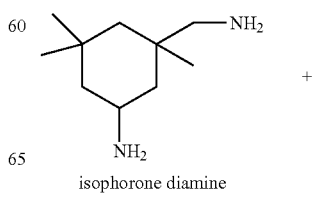

isophorone diamine

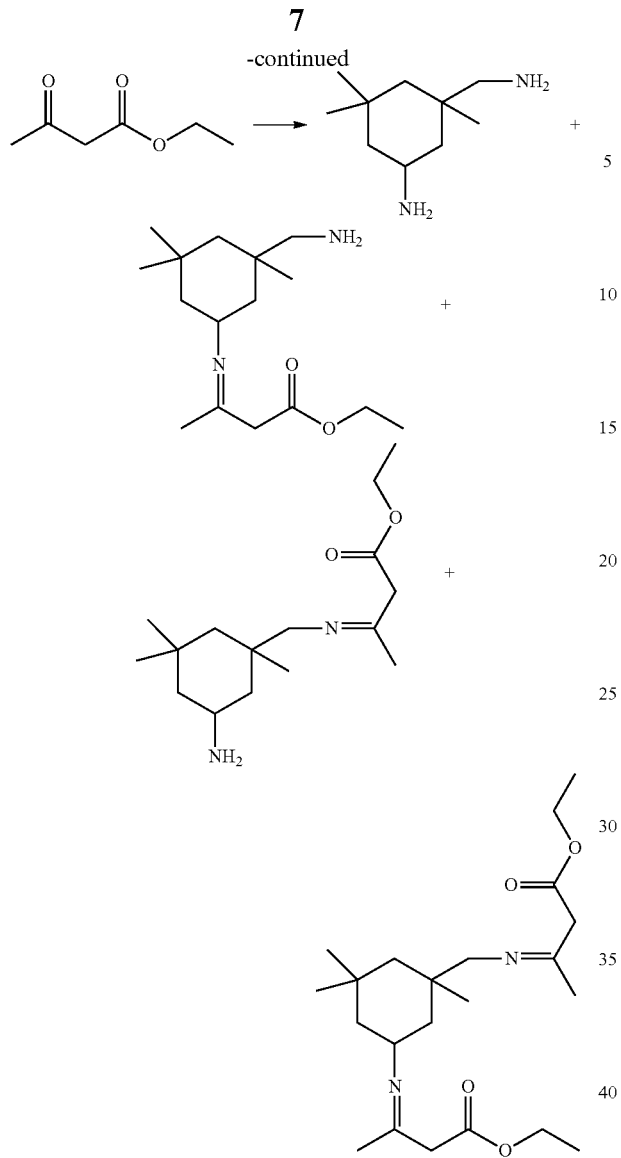

Curable compositions were prepared by mixing 100 phr resin, 1 phr accelerator, and 2 phr peroxide as listed in Table 1. The accelerator was either the reaction product mixture of IPDA and EAA or the Reference Imine. This Reference Imine is an imine according to U.S. Pat. No. 4,042,646.

The compositions were allowed to cure at 20° C.

The cure of the compositions was analyzed by the method of the Society of Plastic Institure (analysis method F/77.1; available from Akzo Nobel Polymer Chemicals). This method involves measuring of the peak exotherm, the time to peak, and the gel time.

According to this method, 20 g of a mixture comprising resin, peroxide, and accelerator were poured into a test tube and a thermocouple was placed through the enclosure at the centre of the tube. The glass tube was then placed in climate controlled room maintained at 20° C. and the time-temperature curve was measured. From the curve the following parameters were calculated:

Gel time (GT)=time in minutes elapsed between the start of the experiment and 5.5° C. above the bath temperature.

Time to peak exotherm (TTP)=time elapsed between the start of the experiment and the moment the peak exotherm was reached.

Peak Exotherm (PE)=the maximum temperature that was reached.

Shore D hardness was determined by standard method ASTM D2240.

Also the colour the final cured resin was evaluated.

The results are listed in Table 1.

TABLE 1

| Accelerator: Peroxide | Ref. Imine Butanox M50 | IPDA/EAA Butanox M50 | IPDA/EAA Butanox P-50 | IPDA/EAA Trigonox 233 |
|---|---|---|---|---|
| Gt [min · sec] | 11.27 | 8.14 | 6.24 | 9.01 |
| TTP [min · sec] | 35.12 | 24.00 | 15.30 | 30.33 |
| PE [° C.] | 44 | 129 | 168 | 68 |
| Shore D [48 h] | 65-70 | 75-80 | 80-85 | 65-70 |
| colour: | str. yellowish | blanco | Yellowish | blanco |

These data show that the imine according to the invention results in better cure behavior than the reference imine and can be used in combination with various peroxides.

The invention claimed is:

1. Process for curing a thermoset resin comprising the step of contacting said resin with
   (i) one or more imines of the structure

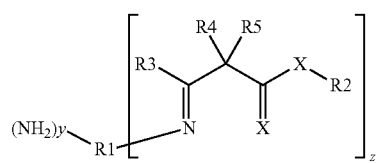

wherein
   $y=0$ or 1, $z=1-4$, and $y+z \geq 2$,
   X is independently selected from the group consisting of O, S, P, NH, N—R1, and N—OH
   R1 is selected from the group consisting of linear or branched, cyclic, bi-cyclic, or tri-cyclic alkylene groups with 2-18 carbon atoms, arylene groups with 6-12 carbon atoms, and aralkylene groups with 2-18 carbon atoms,
   R2-R5 are each individually selected from the group consisting of hydrogen, linear or branched alkyl groups having 1-18 carbon atoms, cycloalkyl groups having 3-12 carbon atoms, aryl groups having 6-12 carbon atoms, aralkyl groups having 6-18 carbon atoms, alkoxy groups having 1-6 carbon atoms, and aryloxy groups;
   each of said R-groups may optionally be substituted with O, S, Si, P, or N-containing substituents,
   R4 and R5; R3 and R4; R2, R5 and R1 and R3 may optionally form ring, and
   (ii) a peroxide.

2. Process according to claim 1 wherein X is an oxygen atom.

3. Process according to claim 1 wherein R5 is hydrogen.

4. Process according to claim 1 wherein R4 is hydrogen.

5. Process according to claim 1 wherein R2 and R3 are alkyl groups.

6. Process according to claim 1 wherein the one or more imines is/are the reaction product of a polyamine and a 3-oxoalkanoic acid alkyl ester.

7. Process according to claim 6 wherein the 3-oxoalkanoic acid alkyl ester is ethyl acetoacetate.

8. Process according to claim 6 wherein the polyamine is isophorone diamine.

9. Process according to claim 6 wherein the polyamine and the 3-oxoalkanoic acid alkyl ester are added individually to the thermoset resin, resulting in in-situ formation of the one or more imines.

10. Process according to claim 6 wherein the polyamine and the 3-oxoalkanoic acid alkyl ester have been reacted to form the one or more imines prior to its/their addition to the thermoset resin.

11. Process according to claim 1 wherein the peroxide is selected from ketone peroxides and organic hydroperoxides.

12. Process according to claim 11 wherein the ketone peroxide is methyl ethyl ketone peroxide, methyl isopropyl ketone peroxide, or methyl isobutyl ketone peroxide.

13. Process according to claim 1 wherein said resin is contacted with said one or more imines in an amount of 0.5 to 2 parts by weight of imine per 100 parts by weight of resin.

14. Process according to claim 1 wherein said resin is contacted with said peroxide in an amount of 1 to 2 parts by weight of peroxide per 100 parts by weight of resin.

\* \* \* \* \*